United States Patent [19]

Licari et al.

[11] Patent Number: 4,538,739
[45] Date of Patent: Sep. 3, 1985

[54] MAGAZINE RACK

[76] Inventors: Yaffa Licari; Vito Licari, both of 875 Ocean Ave., Elberon, N.J. 07740

[21] Appl. No.: 444,081

[22] Filed: Nov. 24, 1982

[51] Int. Cl.³ .............................................. A47F 7/00
[52] U.S. Cl. .................................... 211/189; 211/50; D6/476
[58] Field of Search ............... 211/189, 40, 50, 42, 211/43; D6/449, 462, 476; 248/95, 97, 99

[56] References Cited

U.S. PATENT DOCUMENTS

| D. 150,379 | 7/1948 | Spence | D6/184 |
| D. 171,645 | 3/1954 | Fraley | D6/184 |
| 3,737,129 | 6/1973 | Foster | 248/99 X |
| 3,850,303 | 11/1974 | Franklin | 211/43 X |
| 4,162,013 | 7/1979 | Tucker | 211/43 |

FOREIGN PATENT DOCUMENTS

WO81/00418  10/1981  PCT Int'l Appl. .................. 211/40

Primary Examiner—Robert W. Gibson, Jr.

[57] ABSTRACT

A stackable magazine rack is made from as few as two or three members, each of which includes its own integral connectors for interconnecting the individual members to form the rack.

5 Claims, 12 Drawing Figures 3,538,739

MAGAZINE RACK

FIELD OF THE INVENTION

The present invention relates to magazine racks, and, more particularly, to such racks which are constructed from components interconnected by monolithically formed connectors.

BACKGROUND OF THE INVENTION

In the past, magazine racks have been made from numerous parts and pieces which are usually connected by separate fastening devices, such as screws and bolts, or by welding. Because of the numerous parts and pieces which make up these prior art magazine racks and the special tools required for assembling them, the racks can be expensive to manufacture and time consuming to assemble. The purchase price of these racks to a consumer can be so high as to significantly limit the number of potential buyers.

Once assembled, many of the prior art magazine racks are large and cumbersome, thereby restricting their use. Even though certain prior art magazine racks have been designed to be compact, none of these racks is stackable so as to facilitate its display and transportation with other racks of the same type. Generally, increases in transportation expenses result in increases in the purchase price of the racks to the consumer, thereby further limiting the number of potential buyers.

SUMMARY OF THE INVENTION

The present invention relates to a unique magazine rack which overcomes the disadvantages and shortcomings of the prior art magazine racks described above. More particularly, the new and improved magazine rack has a body which includes a pair of sides and a bottom extending between the two sides. In accordance with the improvement, the body of the magazine rack is made from as few as two or three members, each of which includes connecting means, such as a male or female connector, formed monolithically therewith for the purpose of interconnecting the members to form the rack body. The utilization of monolithically formed connectors is advantageous because it reduces the number of parts required to make the rack and eliminates the necessity of using special tools in order to assemble the rack, thereby facilitating manufacture and assembly. Inasmuch as the manufacture and asembly of the rack are facilitated, the cost of constructing the rack is reduced. This reduction in construction costs results in a lower purchase price for the consumer, thereby increasing the number of potential buyers. In order to facilitate display and transportation of the rack, the sides thereof can diverge from each other so as to permit the rack to be nested within another identical rack.

In accordance with one embodiment, the magazine rack is made from two identical members. Each member has monolithically formed connectors adapted to permit it to be snapped onto the other member without the use of special tools.

In accordance with another embodiment, the magazine rack is made from a pair of identical side members and a bottom member. The side members and the bottom member are provided with monolithically formed connectors adapted to permit the side members to be snapped onto the bottom member without the use of special tools.

BRIEF DESCRIPTION OF THE DRAWINGS

For a more complete understanding of the present invention, reference is made to the following description of three exemplary embodiments considered in conjunction with the accompanying figures of the drawings, in which.

DETAILED DESCRIPTION OF THE EXEMPLARY EMBODIMENTS

Figure 1:
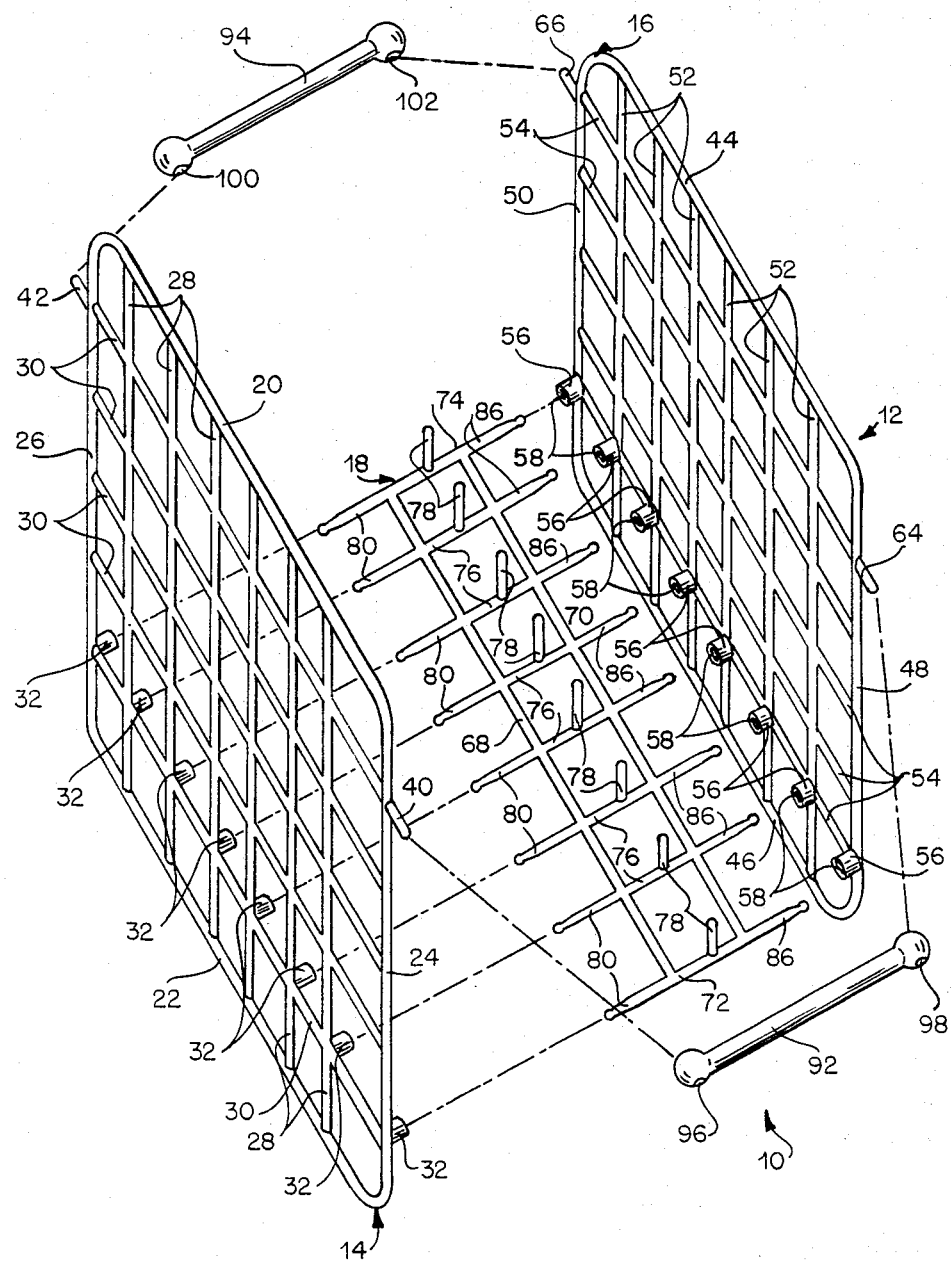
FIG. 1 is an exploded perspective view of one embodiment of a magazine rack constructed in accordance with the present invention.
Figure 2:
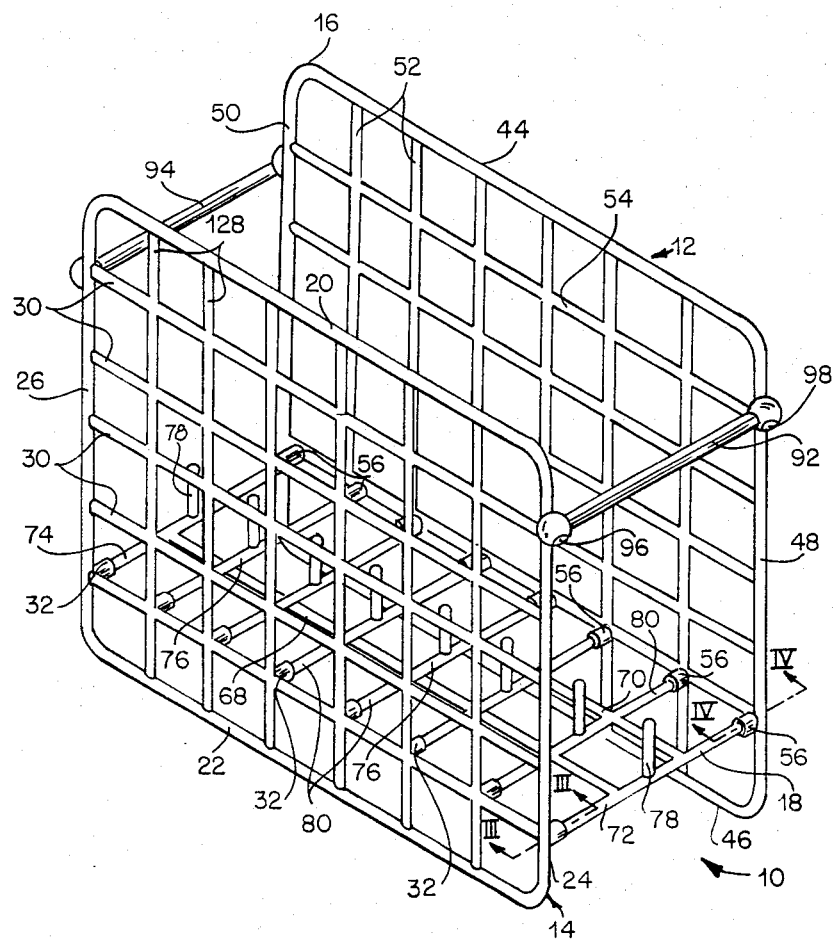
FIG. 2 is a perspective view of the magazine rack illustrated in FIG. 1, the rack being shown in its assembled state.
Figure 3:
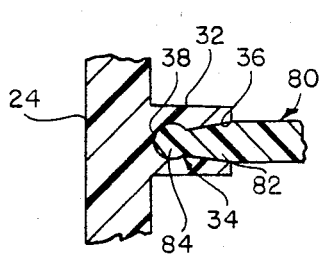
FIG. 3 is a cross-sectional view, taken along line III—III in FIG. 2 and looking in the direction of the arrows, showing a portion of the rack illustrated in FIG. 2.
Figure 4:
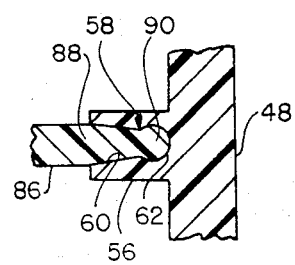
FIG. 4 is a cross-sectional view, taken along line IV—IV in FIG. 2 and looking in the direction of the arrows, showing a portion of the rack illustrated in FIG. 2.
Figure 5:
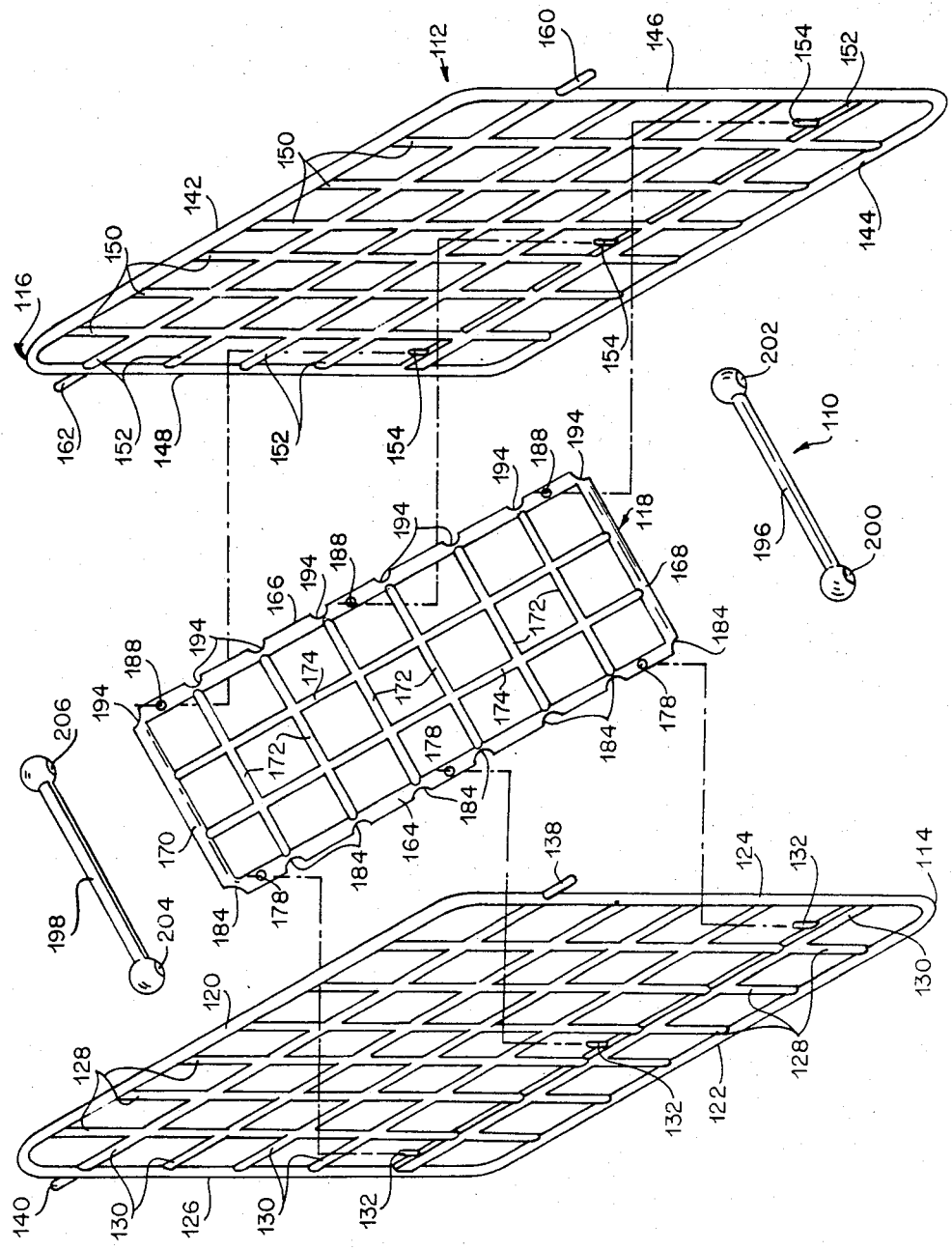
FIG. 5 is an exploded perspective view of a second embodiment of a magazine rack constructed in accordance with the present invention.
Figure 6:
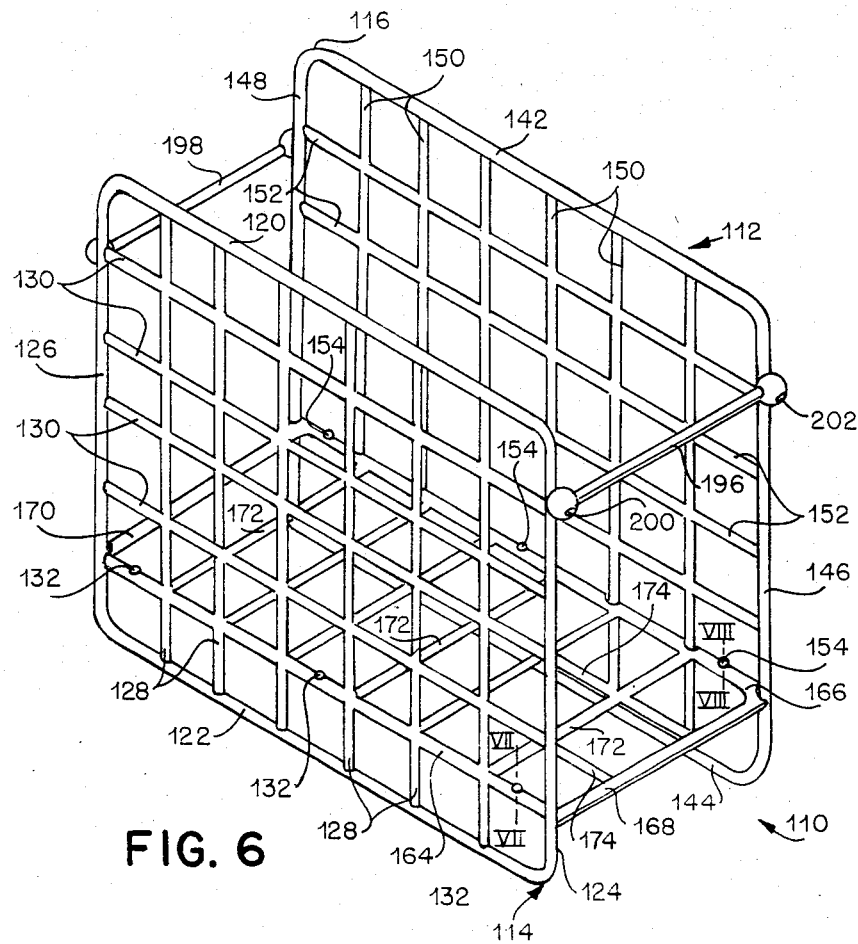
FIG. 6 is a perspective view of the magazine rack illustrated in FIG. 5, the rack being shown in its assembled state.

With reference to FIGS. 1–4, there is shown a magazine rack 10 including a body 12 formed from two identical side members 14, 16 and a bottom member 18. Each of the side members 14, 16 is injection molded from a plastic, such as polypropylene, as a unitary component. The bottom member 18 is similarly molded from a plastic, such as polypropylene, as a unitary component. What follows is a more detailed description of each of these components and how they are assembled to form the rack 10.

The side member 14 has a top 20, a bottom 22 and a pair of ends 24, 26. Vertical ribs 28 extend between the top 20 and the bottom 22 of the side member 14 at spaced intervals, while horizontal ribs 30 extend between the ends 24, 26 of the side member 14 at spaced intervals. Each of the vertical ribs 28 intersects with the horizontal ribs 30 to give the side member 14 a latticed design.

Bosses 32, which protrude from the otherwise planar side member 14, are spaced along the length of the lowermost one of the horizontal ribs 30. Each of the bosses 32 is provided with a female connector 34 including an inwardly tapered channel 36 and an internal socket 38 communicating with the channel 36 and having a diameter slightly greater than the diameter of the adjacent narrow end of the channel 36 (see FIG. 3).

Pins 40, 42 project from the ends 24, 26, respectively, of the side member 14. The pins 40, 42 are formed monolithically with the side member 14 and located between the top 20 and the bottom 22 thereof.

The side member 16 has a top 44, a bottom 46 and a pair of ends 48, 50. Vertical ribs 52 extend between the top 44 and the bottom 46 of the side member 16 at spaced intervals, while horizontal ribs 54 extend between the ends 48, 50 of the side member 16 at spaced intervals. Each of the vertical ribs 52 intersects with the horizontal ribs 54 to give the side member 16 a latticed design.

Bosses 56, which protrude from the otherwise planar side member 16, are spaced along the length of the lowermost one of the horizontal ribs 54. Each of the bosses 56 is formed monolithically with the side member 16 and provided with a female connector 58 including an inwardly tapered channel 60 and an internal socket 62 communicating with the channel 60 and having a diameter slightly greater than the diameter of the adjacent narrow end of the channel 60 (see FIG. 4).

Pins 64, 66 project from the ends 48, 50, respectively, of the side member 16. The pins 64, 66 are formed monolithically with the side member 16 and are located between the top 44 and the bottom 46 thereof.

The bottom member 18, which is substantially planar, has a pair of edges 68, 70 and a pair of ends 72, 74. Ribs 76 extend between the edges 68, 70 of the bottom member 18. The ribs 76, which are formed monolithically with the bottom member 18, give the bottom member 18 a latticed design. Relatively short rods 78 are also formed monolithically with the bottom member 18. The rods 78, which extend upwardly from the ends 72, 74 and the ribs 76 of the bottom member 18, cooperate with each other to form a divider for the body 12 of the rack 10.

Male connectors 80 extend outwardly from the edge 68 of the bottom member 18. Each male connector 80 includes a tapered body 82 and a round head 84 (see FIG. 3). Because the tapered bodies 82 have a size and shape which substantially match the size and shape of the channels 36 of the female connectors 34 formed in the side member 14 and the heads 84 have a size and shape which substantially match the size and shape of the sockets 38 of the female connectors 34 formed in the side member 14, a snap fit is created between the female connectors 34 of the side member 14 and the male connectors 80 of the bottom member 18.

Male connectors 86 extend outwardly from the edge 70 of the bottom member 18. Each of the male connectors 86 includes a tapered body 88 and a round head 90 (see FIG. 4). Because the tapered bodies 88 have a size and shape which substantially match the size and shape of the channels 60 of the female connectors 58 formed in the side member 16 and the heads 90 have a size and shape which substantially match the size and shape of the sockets 62 of the female connectors 58 formed in the side member 16, a snap fit is created between the female connectors 58 of the side member 16 and the male connectors 86 of the bottom member 18.

In order to assemble the body 12 of the rack 10, the male connectors 80 of the bottom member 18 are snapped into the female connectors 34 of the side member 14 without the use of special tools. Similarly, the male connectors 86 of the bottom member 18 are snapped into the female connectors 58 of the side member 16 without the use of special tools.

Because the interior of the assembled body 12 is substantially open, the rack 10 can be adapted for nesting within another identical rack by simply causing the side members 14, 16 to diverge from each other so that the distance between the top 20 of the side member 14 and the top 44 of the side member 16 is slightly greater than the distance between the bottom 22 of the side member 14 and the bottom 46 of the side member 16. One way of accomplishing such a result is to provide the rack 10 with braces 92, 94. The brace 92 has a hole 96 sized and shaped so as to receive the pin 40 of the side member 14 and a hole 98 sized and shaped so as to receive the pin 64 of the side member 16. The distance between the holes 96, 98 is such that the brace 92 urges the normally parallel side members 14, 16 away from each other. The brace 94 has a hole 100 sized and shaped so as to receive the pin 42 of the side member 14 and a hole 102 sized and shaped so as to receive the pin 66 of the side member 16. The distance between the holes 100, 102 is such that the brace 94 urges the normally parallel side members 14, 16 away from each other, thereby cooperating with the brace 92 to give the body 12 of the rack 10 a slight taper. The braces 92, 94 also rigidify and otherwise strengthen the rack 10.

Referring to FIGS. 5-8, there is shown a magazine rack 110 including a body 112 formed from two identical side members 114, 116 and a bottom member 118. Each of the side members 114, 116 is injection molded from a plastic, such as polypropylene, as a unitary component. The bottom member 118 is similarly molded from a plastic, such as polypropylene, as a unitary component. What follows is a more detailed description of each of these components and how they are assembled to form the rack 110.

The side members 114 has top 120, a bottom 122 and a pair of ends 124, 126. Vertical ribs 128 extend between the top 120 and the bottom 122 of the side member 114 at spaced intervals, while horizontal ribs 130 extend between the ends 124, 126 of the side member 114 at spaced intervals. Each of the vertical ribs 128 intersects with the horizontal ribs 130 to give the side member 114 a latticed design.

Male connectors 132 are formed monolithically with the side member 114 and are spaced along the length of the lowermost one of the horizontal ribs 130, which has a rectangular cross-sectional shape. Each of the male connectors 132 includes a tapered body 134 and a round head 136 (see FIG. 7).

Pins 138, 140 project from the ends 124, 126, respectively, of the side member 114. The pins 138, 140 are formed monolithically with the side member 114 and located between the top 120 and the bottom 122 thereof.

The side member 116 has a top 142, a bottom 144 and a pair of ends 146, 148. Vertical ribs 150 extend between the top 142 and the bottom 144 of the side member 116 at spaced intervals, while horizontal ribs 152 extend between the ends 146, 148 of the side member 116 at spaced intervals. Each of the vertical ribs 150 intersects with the horizontal ribs 152 to give the side member 116 a latticed design.

Male connectors 154 are formed monolithically with the side member 116 and are spaced along the length of the lowermost one of the horizontal ribs 152, which has a rectangular cross-sectional shape. Each of the male connectors 154 includes a tapered body 156 and a round head 158 (see FIG. 8).

Pins 160, 162 project from the ends 146, 148, respectively, of the side member 116. The pins 160, 162 are formed monolithically with the side member 116 and located between the top 142 and the bottom 144 thereof.

The bottom member 118, which is substantially planar, has a pair of edges 164, 166 and a pair of ends 168, 170. Short ribs 172 extend between the edges 164, 166 of the bottom member 118 while long ribs 174 extend between the ends 168, 170 of the bottom member 118. Each of the short ribs 172 intersects with the long ribs 174 to give the bottom member 118 a latticed design.

Figure 7:
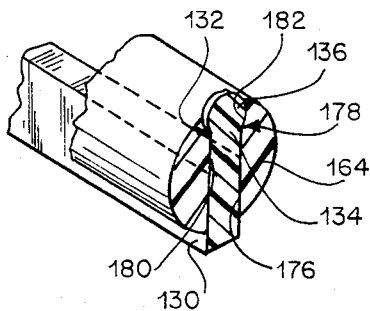
FIG. 7 is a cross-sectional view, taken along line VII—VII in FIG. 6 and looking in the direction of the arrows, showing a portion of the rack illustrated in FIG. 6.

The edge 164 of the bottom member 118 is provided with a downwardly opening trough 176, which runs the length thereof so as to receive the lowermost one of the horizontal ribs 130 of the side member 114, and a plurality of female connectors 178 communicating with the trough 176 (see FIG. 7). Each of the female connectors 178 includes an inwardly tapered channel 180 and a socket 182 communicating with the channel 180 and having a diameter slightly greater than the diameter of the adjacent narrow end of the channel 180 (see FIG. 7). Because the channels 180 have a size and shape which substantially match the size and shape of the bodies 134 of the male connectors 132 provided on the side member 114 and the sockets 182 have a size and shape which substantially match the size and shape of the heads 136 of the male connectors 132 provided on the side member 114, a snap fit is created between the male connectors 132 of the side member 114 and the female connectors 178 of the bottom member 118. Notches 184 are also formed in the edge 164 of the bottom member 118. Each of the notches 184 is located so as to receive a corresponding one of the vertical ribs 128 of the side member 114 when the side member 114 is snapped onto the bottom member 118.

Figure 8:
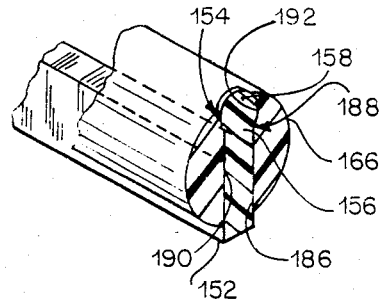
FIG. 8 is a cross-sectional view, taken along line VIII—VIII in FIG. 6 and looking in the direction of the arrows, showing a portion of the rack illustrated in FIG. 6.
Figure 9:
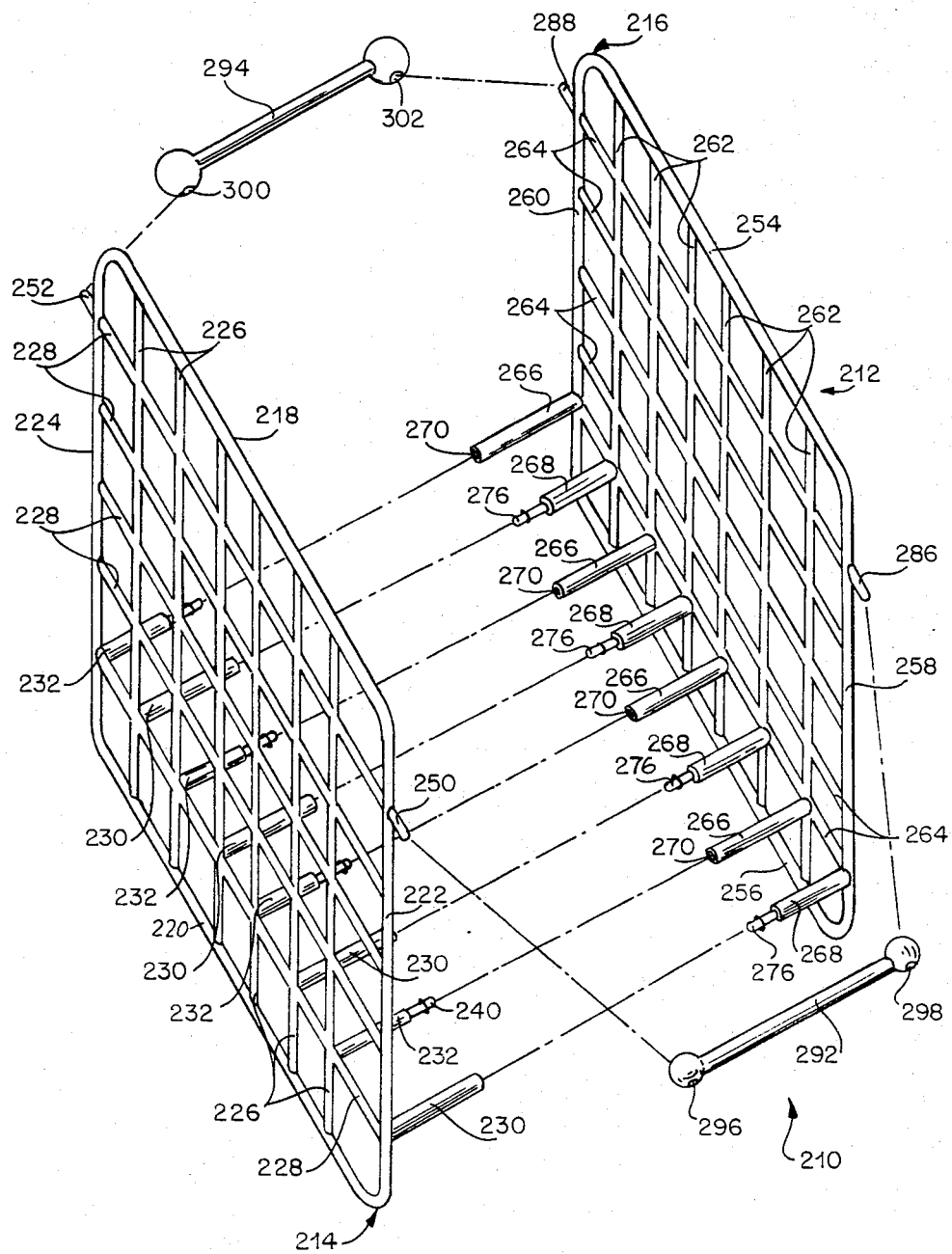
FIG. 9 is an exploded perspective view of a third embodiment of a magazine rack constructed in accordance with the present invention.
Figure 10:
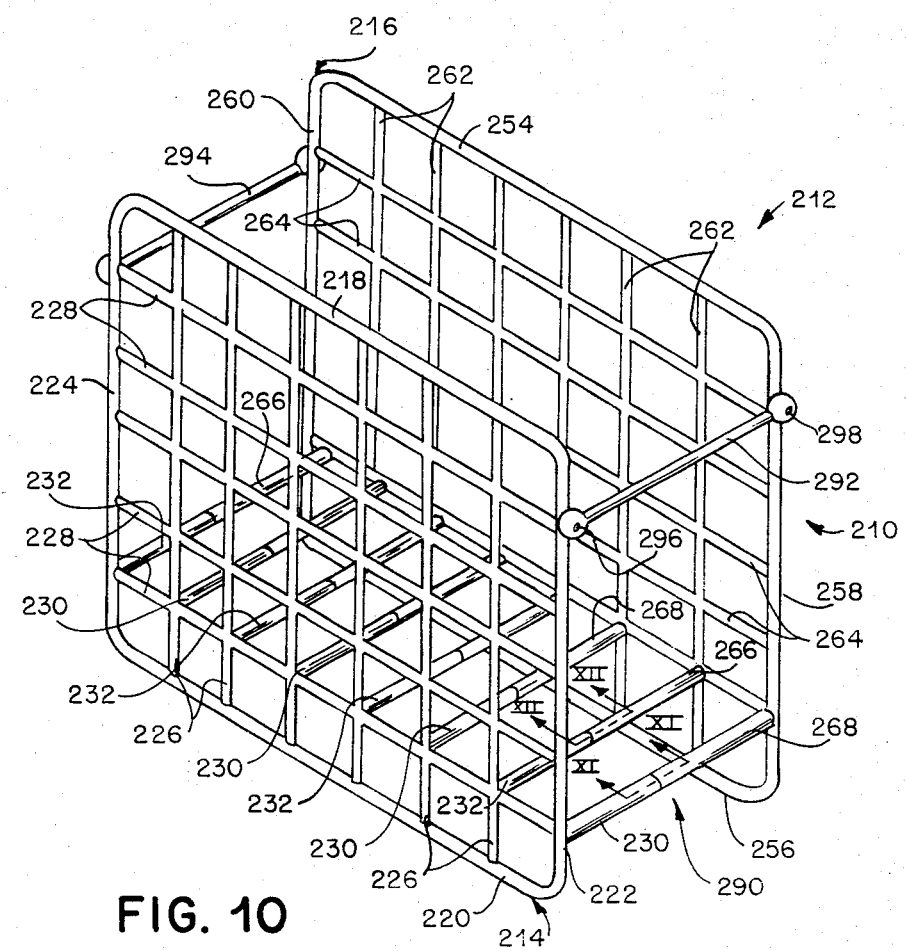
FIG. 10 is a perspective view of the magazine rack illustrated in FIG. 9, the rack being shown in its assembled state.
Figure 11:
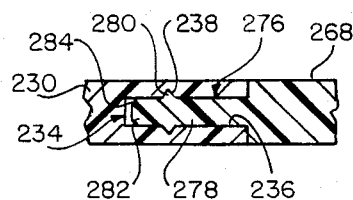
FIG. 11 is a cross-sectional view, taken along line XI—XI in FIG. 10 and looking in the direction of the arrows, showing a portion of the rack illustrated in FIG. 10.

The edge 166 of the bottom member 118 is provided with a downwardly opening trough 186, which runs the length thereof so as to receive the lowermost one of the horizontal ribs 152 of the side member 116, and a plurality of female connectors 188 communicating with the trough 186 (see FIG. 8). Each of the female connectors 188 includes an inwardly tapered channel 190 and a socket 192 communicating with the channel 190 and having a diameter slightly greater than the diameter of the adjacent narrow end of the channel 190 (see FIG. 8). Because the channels 190 have a size and shape which substantially match the size and shape of the bodies 156 of the male connectors 154 provided on the side member 114 and the sockets 192 have a size and shape which substantially match the size and shape of the heads 158 of the male connectors 154 provided on the side member 116, a snap fit is created between the male connectors 154 of the side member 116 and the female connectors 188 of the bottom member 118. Notches 194 are also formed in the edge 166 of the bottom member 118. Each of the notches 194 is located so as to receive a corresponding one of the vertical ribs 150 of the side member 116 when the side member 116 is snapped onto the bottom member 118.

In order to assemble the body 112 of the rack 110, the male connectors 132 of the side member 114 are snapped into the female connectors 178 of the bottom member 118 without the use of special tools. Similarly, the male connectors 154 of the side member 116 are snapped into the female connectors 188 of the bottom member 118 without the use of special tools.

Because the interior of the assembled body 112 is substantially open, the rack 110 can be adapted for nesting within another identical rack by simply causing the side members 114, 116 to diverge from each other so that the distance between the top 120 of the side member 114 and the top 142 of the side member 116 is slightly greater than the distance between the bottom 122 of the side member 114 and the bottom 144 of the side member 116. One way of accomplishing such a result is to provide the rack 110 with braces 196, 198. The brace 196 has a hole 200 sized and shaped so as to receive the pin 138 of the side member 114 and a hole 202 sized and shaped so as to receive the pin 160 of the side member 116. The distance between the holes 200, 202 is such that the brace 196 urges the normally parallel side members 114, 116 away from each other. The brace 198 has a hole 204 sized and shaped so as to receive the pin 140 of the side member 114 and a hole 206 sized and shaped so as to receive the pin 162 of the side member 116. The distance between the holes 204, 206 is such that the brace 198 urges the normally parallel side members 114, 116 away from each other, thereby cooperating with the brace 196 to give the body 112 of the rack 110 a slight taper. The braces 196, 198 also rigidify and otherwise strengthen the rack 110.

With reference now to FIGS. 9-12, there is shown a magazine rack 210 including a body 212 formed from two identical side members 214, 216. Each of the side members 214, 216 is injection molded from a plastic, such a polypropylene, as a unitary component. What follows is a more detailed description of each of these components and how they are assembled to form the rack 210.

The side member 214 has a top 218, a bottom 220 and a pair of ends 222, 224. Vertical ribs 226 extend between the top 218 and the bottom 220 of the side member 214 at spaced intervals, while horizontal ribs 228 extend between the ends 222, 224 of the side member 214 at spaced intervals. Each of the vertical ribs 226 intersects with the horizontal ribs 228 to give the side member 214 a latticed design.

Elongated elements 230, 232, which protrude from the otherwise planar side member 214, are spaced alternately along the length of the lowermost one of the horizontal ribs 228. Each of the elements 230 is provided with a female connector 234 including an internal cylindrical socket 236 and an annular groove 238 communicating with the socket 236 and having a diameter slightly greater than the diameter of the socket 236 (see FIG. 11). Each of the elements 232 is provided with a male connector 240 including a cylindrical body 242, an annular shoulder 244, and a head 246 with a tapered crown 248 (see FIG. 12).

Pins 250, 252 project from the ends 222, 224, respectively, of the side member 214. The pins 250, 252 are formed monolithically with the side member 214 and located between the top 218 and the bottom 220 thereof.

The side member 216 has a top 254, a bottom 256 and a pair of ends 258, 260. Vertical ribs 262 extend between the top 254 and the bottom 256 of the side member 216 at spaced intervals, while horizontal ribs 264 extend between the ends 258, 260 of the side member 216 at spaced intervals. Each of the vertical ribs 262 intersects with the horizontal ribs 264 to give the side member 216 a latticed design.

Elongated elements 266, 268, which protrude from the otherwise planar side member 216, are spaced alternately along the length of the lowermost one of the horizontal ribs 264. Each of the elements 266 is provided with a female connector 270 including an internal cylindrical socket 272 and an annular groove 274 communicating with the socket 272 and having a diameter slightly greater than the diameter of the socket 272 (see FIG. 12). Each of the elements 268 is provided with a male connector 276 including a cylindrical body 278, an annular shoulder 280, and a head 282 with a tapered crown 284 (See FIG. 11).

Pins 286, 288 project from the ends 258, 260 respectively, of the side member 216. The pins 286, 288 are formed monolithically with the side member 216 and located between the top 254 and the bottom 256 thereof.

Figure 12:
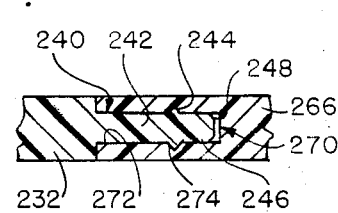
FIG. 12 is a cross-sectional view, taken along line XII—XII in FIG. 10 and looking in the direction of the arrows, showing a portion of the rack illustrated in FIG. 10.

The female connectors 270 of the side member 216 are sized and shaped so as to mate with the male connectors 240 of the side member 214, the shoulders 244 of the male connectors 240 cooperating with the grooves 274 of the female connectors 270 to form a snap fit between the elements 232 of the side member 214 and the elements 266 of the side member 216 (see FIG. 12). The male connectors 276 of the side member 216 are sized and shaped so as to mate with the female connectors 234 of the side member 214, the shoulders 280 of the male connectors 276 cooperating with the grooves 238 of the female connectors 234 to form a snap fit between the elements 230 of the side member 214 and the elements 268 of the side member 216 (see FIG. 11). When the side members 214, 216 are attached to each other, the elements 230, 232 of the side member 214 cooperate with the elements 266, 268 of the side member 216 to form a bottom 290 of the rack 210.

In order to assemble the body 212 of the rack 210, the male connectors 240 of the side member 214 are snapped into the female connectors 270 of the side member 216 without the use of special tools. Similarly, the male connectors 276 of the side member 216 are snapped into the female connectors 234 of the side member 214 without the use of special tools.

Because the interior of the assembled body 212 is completely open, the rack 210 can be adapted for nesting within another identical rack by simply causing the side members 214, 216 to diverge from each other so that the distance between the top 218 of the side member 214 and the top 254 of the side member 216 is slightly greater than the distance between the bottom 220 of the side member 214 and the bottom 256 of the side member 216. One way of accomplishing such a result is to provide the rack 210 with braces 292, 294. The brace 292 has a hole 296 sized and shaped so as to receive the pin 250 of the side member 214 and a hole 298 sized and shaped so as to receive the pin 286 of the side member 216. The distance between the holes 296, 298 is such that the brace 292 urges the normally parallel side members 214, 216 away from each other. The brace 294 has a hole 300 sized and shaped so as to receive the pin 252 of the side member 214 and a hole 302 sized and shaped so as to receive the pin 288 of the side member 216. The distance between the holes 300, 302 is such that the brace 294 urges the normally parallel side members 214, 216 away from each other, thereby cooperating with the brace 292 to give the body 212 of the rack 210 a slight taper. The braces 292, 294 also rigidify and otherwise strengthen the rack 210.

It will be understood that the embodiments described herein are merely exemplary and that a person skilled in the art may make many variations and modifications without departing from the spirit and scope of the invention. For instance, standard friction fits could replace the snap fits described hereinabove. Also, the various elements could be solid or hollow. All such modifications and variations are intended to be included within the scope of the invention as defined in the appended claims.

We claim:

1. In a magazine rack which includes a body having a pair of side members and a bottom member extending between the side members, the improvement comprising first connecting means formed monolithically with one of said side members, said one side member including a generally planar portion and a plurality of elongated elements extending outwardly from said planar portion of said one side member at spaced intervals therealong, said first connecting means including a plurality of male connectors, each male connector being formed monolithically with a corresponding one of said elongated elements of said one side member, and a plurality of female connectors, each female connector being formed monolithically with a corresponding one of said elongated elements of said one side member, and second connecting means formed monolithically with the other side member, said other side member including a generally planar portion and a plurality of elongated elements extending outwardly from said planar portion of said other side member at spaced intervals therealong, said second connecting means including a plurality of male connectors, each male connector being formed monolithically with a corresponding one of said elongated elements of said other side member, and a plurality of female connectors, each female connector being formed monolithically with a corresponding one of said elongated elements of said other side member, said male connectors of said one side member mating in a snap fit with said female connectors of said other side member and said female connectors of said one side member mating in a snap fit with said male connectors of said other side member such that said planar portion of said one side member defines one side of said rack, said planar portion of said other side member defines an opposite side of said rack, and said elongated elements of said one side member cooperate with said elongated elements of said other side member to define said bottom member of said rack.

2. An improved magazine rack according to claim 1, wherein said body is substantially open between said side members and said side members diverge from each other, whereby said rack may be nested within another rack identical thereto.

3. An improved magazine rack according to claim 1, wherein said rack is made entirely of plastic.

4. A plastic magazine rack, comprising a first side member, having a substantially planar portion, a plurality of elongated elements extending outwardly from said planar portion of said first side member and formed monolithically therewith, a plurality of male connectors, each of said male connectors being formed monolithically with a corresponding one of said elongated elements of said first side member, and a plurality of female connectors, each of said female connectors being formed monolithically with a corresponding one of said elongated members of said first side member, and a second side member having a substantially planar portion, a plurality of elongated elements extending outwardly from said planar portion of said second side member and formed monolithically therewith, a plurality of male connectors, each of said male connectors being formed monolithically with a corresponding one of said elongated elements of said second side member and sized and shaped so as to mate in a snap fit with said female connectors of said first side member, and a plurality of female connectors, each of said female connectors being formed monolithically with a corresponding one of said elongated elements of said second side member and sized and shaped so as to mate in a snap fit with said male connectors of said first side member, whereby said elongated elements of said first side member cooperate with said elongated elements of said second side member to form a bottom for said rack.

5. A plastic magazine rack according to claim 4, wherein said first and second side members are identical to each other.

* * * * *